United States Patent
Klein et al.

(10) Patent No.: US 12,001,802 B2
(45) Date of Patent: Jun. 4, 2024

(54) TRAINING ENRICHMENT SYSTEM FOR NATURAL LANGUAGE PROCESSING

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 17/337,835

(22) Filed: Jun. 3, 2021

(65) Prior Publication Data

US 2022/0391592 A1    Dec. 8, 2022

(51) Int. Cl.
G06F 40/30     (2020.01)
G06F 16/951    (2019.01)
G06N 20/00     (2019.01)

(52) U.S. Cl.
CPC ............ G06F 40/30 (2020.01); G06F 16/951 (2019.01); G06N 20/00 (2019.01)

(58) Field of Classification Search
CPC ........ G06F 40/30; G06F 16/951; G06N 20/00
See application file for complete search history.

(56) References Cited

U.S. PATENT DOCUMENTS

| | | | | |
|---|---|---|---|---|
| 2015/0317303 A1* | 11/2015 | Zhang | ..................... | G06F 40/40 707/776 |
| 2019/0005021 A1* | 1/2019 | Miller | ..................... | G10L 15/26 |

OTHER PUBLICATIONS

Brunner, G. et al., "On identifiability in transformers," International Conference on Learning Representations, 2020, pp. 1-35.
Devlin, J. et al., "BERT: Pre-training of Deep Bidirectional Transformers for Language Understanding," arXiv:1810.04805v2 [cs.CL], May 24, 2019, 16 pages.
Emami, A. et al., "A Knowledge Hunting Framework for Common Sense Reasoning," Proceedings of the 2018 Conference on Empirical Methods in Natural Language Processing, Oct. 31-Nov. 4, 2018, pp. 1949-1958.
Emami, A. et al., "The KnowRef Coreference Corpus: Removing Gender and Number Cues for Difficult Pronominal Anaphora Resolution," Proceedings of the 57th Annual Meeting of the Association for Computational Linguistics, Jul. 28-Aug. 2, 2019, pp. 3952-3961.

(Continued)

*Primary Examiner* — Ibrahim Siddo
(74) *Attorney, Agent, or Firm* — Sterne, Kessler, Goldstein & Fox P.L.L.C.

(57) ABSTRACT

Disclosed herein are various embodiments for training and enriching a natural language processing system. An embodiment operates by identifying a natural language processor (NLP) trained on a first set of documents, wherein the NLP is trained to perform a set of functionality based on the first set of documents. An industry, set of words corresponding to the industry, and set of sentences including at least a subset of the set of words in which the NLP is to be configured to perform the set of functionality are identified. A set of sentences that exceed a similarity threshold are identified. The NLP is trained with the subset of the set of sentences that exceed the similarity threshold, wherein the trained NLP with the subset is configured to perform the set of functionality within the industry with a greater accuracy than NLP trained on only the first set of documents.

20 Claims, 3 Drawing Sheets

(56) References Cited

OTHER PUBLICATIONS

He, P. et al., "A Hybrid Neural Network Model for Commonsense Reasoning," Proceedings of the First Workshop on Commonsense Inference in Natural Language Processing, Nov. 3, 2019, pp. 13-21.
Kavumba, P. et al., "When Choosing Plausible Alternatives, Clever Hans can be Clever," Proceedings of the First Workshop on Common sense Inference in Natural Language Processing, Nov. 3, 2019, pp. 33-42.
Klein, T. and Nabi, M., "Attention Is (not) All You Need for Commonsense Reasoning," Proceedings of the 57th Annual Meeting of the Association for Computational Linguistics, Jul. 28-Aug. 2, 2019, pp. 4831-4836.
Klein, T. and Nabi, M., "Contrastive Self-Supervised Learning for Commonsense Reasoning," Proceedings of the 58th Annual Meeting of the Association for Computational Linguistics, Jul. 5-10, 2020, pp. 7517-7523.
Klein, T. and Nabi, M., "Contrastive Self-Supervised Learning for Commonsense Reasoning," arXiv:2005.00669v1 [cs.CL], May 2, 2020, 7 pages.
Kocijan, V. et al., "A Surprisingly Robust Trick for the Winograd Schema Challenge," Proceedings of the 57th Annual Meeting of the Association for Computational Linguistics (ACL), Jul. 28-Aug. 2, 2019, pp. 4837-4842.
Kocijan, V. et al., "WikiCREM: A Large Unsupervised Corpus for Coreference Resolution," Proceedings of the 2019 Conference on Empirical Methods in Natural Language Processing (EMNLP), Nov. 3-7, 2019, pp. 4303-4312.
Levesque, H. et al., "The Winograd Schema Challenge," Proceedings of the Thirteenth International Conference on Principles of Knowledge Representation and Reasoning, 2012, pp. 552-561.
Liu, Y. et al., "RoBERTa: A Robustly Optimized BERT Pretraining Approach," arXiv:1907.11692v1 [cs.CL]. Jul. 26, 2019, 13 pages.
Marcus, G., "The Next Decade In AI: Four Steps Towards Robust Artificial Intelligence," downloaded from https://arxiv.org/abs/2002.06177, Feb. 17, 2020, pp. 1-59.
Opitz, J. and Frank, A., "Addressing The Winograd Schema Challenge as a Sequence Ranking Task," Proceedings of the First International Workshop on Language Cognition and Computational Models, Aug. 20, 2018, pp. 41-52.
Peng, H. et al., "Solving Hard Coreference Problems," Human Technologies: The 2015 Annual Conference of the North American Chapter of the ACL, Denver, Colorado, May 31-Jun. 5, 2015, pp. 809-819.
Rahman, A. and NG, V., "Resolving Complex Cases of Definite Pronouns: The Winograd Schema Challenge," Proceedings of the 2012 Joint Conference on Empirical Methods in Natural Language Processing and Computational Natural Language Learning, Jul. 12-14, 2012, pp. 777-789.
Ruan, Y. et al., "Exploring Unsupervised Pretraining and Sentence Structure Modelling for Winograd Schema Challenge," arXiv:1904.09705v1 [cs.CL], Apr. 22, 2019, 7 pages.
Saba, W.S., "Is there a 'Simple' Machine Learning Method for Commonsense Reasoning?", Oct. 1, 2018, 4 pages.
Sakaguchi, K. et al., "WinoGrande: An Adversarial Winograd Schema Challenge at Scale," arXiv:1907.10641v2 [cs.CL], Nov. 21, 2019, 9 pages.
Tamborrino, A. et al., "Pre-training Is (Almost) All You Need: An Application to Commonsense Reasoning," arXiv:2004.14074v1 [cs.CL], Apr. 29, 2020, 10 pages.
Trichelair, P. et al., "How Reasonable are Common-Sense Reasoning Tasks: A Case-Study On The Winograd Schema Challenge and SWAG," Proceedings of the 2019 Conference on Empirical Methods in Natural Language Processing and the 9th International Joint Conference on Natural Language Processing, Nov. 3-7, 2019, pp. 3382-3387.
Trichelair, P. et al., "How Reasonable are Common-Sense Reasoning Tasks: A Case-Study On The Winograd Schema Challenge and SWAG," arXiv:1811.01778v2 [cs.LG], Sep. 10, 2019, 7 pages.
Trinh, T.H. and LE, Q.V., "A Simple Method for Commonsense Reasoning," arXiv:1806.02847v2 [cs.AI], Sep. 26, 2019, 12 pages.
Vaswani, A. et al., "Attention Is All You Need," 31st Conference on Neural Information Processing Systems (NIPS 2017), Long Beach, CA, USA, 2017, 11 pages.
Vig, J. and Belinkov, Y., "Analyzing the Structure of Attention in a Transformer Language Model," Proceedings of the Second BlackboxNLP Worksop on Analyzing and Interpreting Neural Networks for NLP, Aug. 1, 2019, pp. 63-76.
Wang, S.H. et al., "Unsupervised Deep Structured Semantic Models for Commonsense Reasoning," Proceedings of NAACL-HLT 2019, Minneapolis, Minnesota, Jun. 2-Jun. 7, 2019, pp. 882-891.
Wolf, T. et al. "Transformers: State-of-the-Art Natural Language Processing," arXiv:1910.03771v5 [cs.CL], Jul. 14, 2020, 8 pages.
Yang, H. et al., "Supervised Learning of Semantics-Preserving Hash via Deep Convolutional Neural Networks," IEEE Transactions on Pattern Analysis and Machine Intelligence, arXiv:1507.00101v2 [cs.CV], Feb. 14, 2017, 15 pages.
Ye, Z. et al., "Align, Mask and Select: A Simple Method for Incorporating Commonsense Knowledge into Language Representation Models," arXiv:1908.06725v5 [cs.CL], May 6, 2020, 10 pages.
Zhang, T. et al., "BERTScore: Evaluating Text Generation with BERT," ICLR 2020, arXiv:1904.09675v3 [cs.CL], Feb. 24, 2020, 43 pages.

* cited by examiner

TRAINING ENRICHMENT SYSTEM FOR NATURAL LANGUAGE PROCESSING

BACKGROUND

With the rise in the popularity of bots, voice responsive devices (VRDs), and artificial intelligence (AI) natural language processing (NLP) have become increasingly important fields in computing. NLP is when a computing device tries to understand a sentence that is provided by a user in the same way a human would understand the sentence. Often times an NLP system will be trained generally on how to interpret voice or text from a user. However a generally trained NLP may not be suitable for being deployed for a specific application or in a particular industry, with its own terminology, because the generally trained NLP will be prone to make a lot of errors as it is learning. By the same token, generating new set of training documents for the specific application or industry is both a resource and time intensive process.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

With the rise in the popularity of bots, voice responsive devices (VRDs), and artificial intelligence (AI) natural language processing (NLP) have become increasingly important fields in computing. NLP is when a computing device tries to understand a sentence that is provided by a user in the same way a human would understand the sentence. Often times an NLP system will be trained generally on how to interpret voice or text from a user. However a generally trained NLP may not be suitable for being deployed for a specific application or in a particular industry, with its own terminology, because the generally trained NLP will be prone to make a lot of errors as it is learning. By the same token, generating new set of training documents for the specific application or industry is both a resource and time intensive process.

Figure 1:
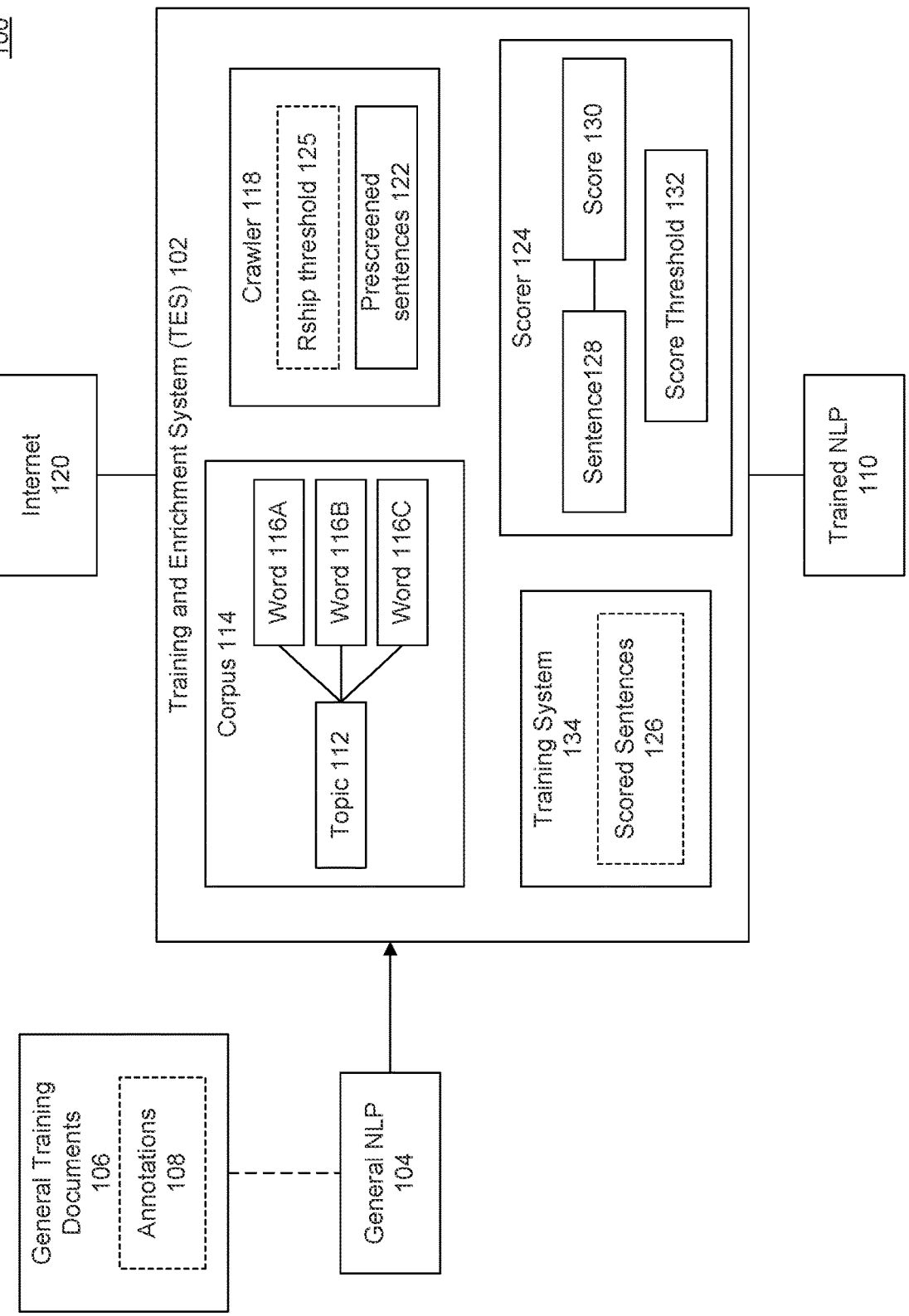
FIG. 1 is a block diagram illustrating functionality related to a system for training and enriching a natural language processing system, according to some example embodiments.

FIG. 1 is a block diagram 100 illustrating functionality related to a system for training and enriching a natural language processing system, according to some example embodiments. A training and enrichment system (TES) 102 may enrich the training of a general natural language processor (NLP) 104 without requiring the same time and resource overhead that may be required or may have been required to initially train general NLP 104.

In some embodiments, TES 102 may enhance the training of a general NLP 104 to produce a trained NLP 110 that may be deployed for a more specific purpose or industry with less training overhead. As a result, trained NLP 110 may produce fewer errors and learn faster than a general NLP 104 deployed in the same task and/or industry.

In some embodiments, general NLP 104 may be used in a variety of devices or applications, including but not limited to bots. A bot may include a chatbot that is configured to receive and respond to written and/or spoken text from a user. General functionality of the bot may include looking up order statuses, providing answers to frequently asked questions, and providing account balances or product availability information. A ticketing system may include a system in which customers or clients may register issues with products, and may include functionality for resolving or troubleshooting common problems. In some embodiments, a ticketing system may include an instantiation of a bot.

In some embodiments, an NLP (general or trained) may be integrated with or otherwise operable and communicatively coupled with a ticketing system or voice responsive device (VRD). A ticketing system may be a system configured to receive and respond to customer inquiries with tickets for helpdesk items. Example VRDs include, but are not limited to, AMAZON ALEXA, GOOGLE HOME, and APPLE SIRI.

In some embodiments, general NLP 104 may be trained with a set of general training docs 106. For example, general training docs 106 may be used to train general NLP 104 on how to interpret speech and commands received from users, in English or other languages. In some embodiments, general training docs 106 may include annotations 108 such that the words and/or sentences are marked with or as being correct and incorrect input and/or output. The annotations 108 may enable NLP to learn how to correctly interpret different commands, requests, or phrases that may be submitted by or received from users or other systems. Using machine learning technologies, an NLP may be trained using annotated input documents 108. These annotations 108 are usually generated through a time consuming manual or resource consuming iterative process, and are expensive to both generate and require extra computing resources for a general NLP 104 to learn from during an initial training.

In some embodiments, general training docs 106 may also be used to train the general NLP 104 to perform some basic functionality, beyond interpreting text/speech. For example, if the general NLP 104 is to be used with a bot, then the general training docs 106 may be used to train the general NLP 104 to perform some basic bot functionality as referred to above. Example general bot functionality may include, but is not limited to, looking up order statuses, providing answers to frequently asked questions, resolving or troubleshooting common problems, and providing account balances or product availability information.

While general NLP 104 may be trained to perform a variety of different functions, problems may arise when an NLP is intended to be used for a more specific purpose or within a specific industry with its own terminology. A general NLP 104 will be prone to make mistakes which could cost companies time, money, reputation, resources, and customers. For example, a general NLP 104 may not be able to properly interpret requests from a user for arrival/departure information in a travel industry. Further, arrival and departure information may be further nuanced across different travel industries such as ship, airline, buses, and trains. Each industry may include its own specific jargon, terminology, or queries that a general NLP 104 is not equipped to either interpret and/or to generate a meaningful response.

However, creating a new set of annotated training documents, specific for an industry or particular task, is both time and resource intensive process and may not justify the cost. As such, a company or organization using the general NLP 104 would have to deal with substandard performance as the general NLP 104 gains familiarity and 'learns' through trial and error, potentially costing the organization customers, time, money, and reputational value.

TES 102 may be used to address these and other shortcomings of a general NLP 104 and a general NLP training process with a streamlined enriched training process. Through the enriched training processes described herein, TES 102 may automatically (e.g., without user involvement) generate a new set of training documents, on the fly or in real-time, specific to a particular topic, industry, or intended usage of general NLP 104. In some embodiments, TES 102 may train general NLP 104 on the new set of training documents to produce a specially enriched trained NLP 110 for a specific use or industry.

In some embodiments, TES 102 may train general NLP 104 on a specific topic 112. Topic 112 may include a general category of information, industry, company, subject matter, or set of functionality for which general NLP 104 is to be trained. Example topics 112 may include "Italian sports cars", "customer relationship management", "company X", "football team Z", "airplanes", "manufacturer Y", "travel status updates," and "sports statistics retrieval". In some embodiments, general NLP 104 may be trained on a different number of topics 112.

In some embodiments, TES 102 may include or have access to a corpus 114. Corpus 114 may include a set of relationships between different topics 112 and words 116A-C (generally referred to as words 116). Corpus 114, may for example, be a database or spreadsheet or diagram illustrating relationships between different words, and may include strengths of those relationships.

For example, the topic 112 "airline" may include various the following corpus 114 of words 116. The corpus 114 below includes both words and a score indicating a strength of relationship to the topic "airline".

| Word | Strength of Rship |
|---|---|
| Airplane | 10 |
| Wings | 6 |
| Airport | 9 |
| Jet | 10 |
| Stewardess | 8 |
| Wheels | 2 |
| Manufacturer A | 7 |
| Windshield | 4 |

Based on corpus 114, a crawler 118 may crawl or search the Internet 120 for the words 116, or highest rated words, across a set of websites or webpages. In some embodiments, corpus 114 may include a set of webpages or websites that are closely related to the identified topic 112. Crawler 118 may then search those enumerated or specified websites for sentences that include the words 116 related to the topic 112. In other embodiments, any document storage system or database may be used in addition to or in lieu of the Internet 120.

Rather than using a known set of documents that have been resource-intensively annotated 108, TES 102 is able to use a random assortment of webpages from the Internet 120. This has the advantage of enabling TES 102 to identify words 116 related to topic 112 being used in a wider range of contexts, creating for better, or more expansive, varied training for lesser costs (than required to perform the annotation process).

In some embodiments, crawler 118 may produce, generate, or compile a set of prescreened sentences 122. Prescreened sentences 122 may include a set of sentences that include one or more words 116 from corpus 114 as relating to topic 112. For example, crawler 118 may search the text of various webpages or documents available over Internet 120 (or another network connection) for the words 116 of corpus 114, and may make a copy of those sentences in a document of prescreened sentences 122.

In some embodiments, the prescreened sentences 122 may need to meet a strength of relationship threshold 125 indicating a minimum score of the identified words in each sentence. For example, the relationship threshold 125 may be "7". So that a sentence that includes only the word "wings" (value 6) would not satisfy the threshold. However, a sentence that includes both the words "wings" (value 6) and "wheels" (value 2) would meet the relationship threshold 125 and be copied to the set of prescreened sentences 122.

In some embodiments, TES 102 may employ a scorer 124 to further refine the prescreened sentences 122 to a set of scored sentences 126 which may be used to train general NLP 104. In some embodiments, scorer 124 may be a heavier weight or more resource intensive scoring mechanism, requiring greater computing resources relative to the prescreening of sentences from Internet 120 performed by crawler 118.

Crawler 118 may use a simple, lightweight scoring relationship to identify prescreened sentences 122, relying on identifying sentences with particular words 116 related to topic 112, and optionally further screening the selected words based on the relationship threshold 125. This may enable crawler 118 to quickly search a wide breath of documents or webpages. In some embodiments, the search and compilation of prescreened sentences 122 as performed by crawler 118 may not require as many resources as another language scoring system used by scorer 124. Scorer 124 may then perform a more detailed or intensive scoring if prescreened sentences 122, since it is a smaller dataset (e.g., relative to the websites of Internet 120).

Using this two search or scoring combination enables TES 102 to search and select an enriching set of scored sentences from a wide berth of documents. For example, using a crawler 118 over a set of live documents, such as those available over the Internet 120, enables TES 102 to expand the capabilities of general NLP 104 based on real language used by a variety of different persons in varying contexts. Further refining the set of prescreened sentences 122 generated by crawler 118 with the more detailed scoring of scorer 124 may ensure that the scored sentences 126, selected from prescreened sentences 122, are closely related to the topic 112, before they are used to train general NLP 104.

In some embodiments, scorer 124 may use BERTScore. BERTScore may be a metric, associated with BERT, that may be used to determine semantic similarities for a language models. BERT (bidirectional encoder representations from transformers) is an example of a transformer-based machine learning technique for natural language processing. BERT is developed by GOOGLE. In some embodiments, general NLP 104 may be trained using BERT. It is understood that BERT and BERTScore are examples of transformers and scoring mechanisms or processes that may be used, while other embodiments may user other transformers and/or scoring processes or scorers.

BertSCORE may be used by TES 102 to identify which sentences of prescreened sentences 122 are most semantically similar to each other. Each sentence 128 (from prescreened sentences 122) may be assigned a score 130 relative to one or more other sentences 128 indicating a similarity between the sentences. TES 102 may then select a subset of the scored sentences that are most semantically similar to each other, based on exceeding a score threshold 132. The sentences 128 whose scores 130 exceed score threshold 132 may be stored as scored sentences 126.

Selecting the most semantically similar sentences as scored sentences 126 may have the advantage of better training the general NLP 104 in the shortest amount of time with the best available and widest variety of data, which will help increase the accuracy and effectiveness of trained NLP 110. For example, it may increase correctness and require take less time and resources to score and screen out less relevant sentences from prescreened sentences 122 than it would be to train general NLP 104 on all the prescreened sentences 122 (which may require greater resources but produce less correct results).

In contrast to the annotated data 108 of general training docs 106 in which the data has been marked with correct/incorrect indications, scored sentences 126 do include either correct or incorrect data, but instead semantically similar sentences. Having excluded noisy data, and selecting only the most semantically similar sentences for scored sentences 126 may cause the general NLP 104 to expand its capabilities with this variant training performed by training system 134.

Training system 134 may include any general training processor or system that can train general NLP 104 to contrast two sentences to learn new notations of similar but different, beyond right/wrong of annotated data 108. This augmented or enriched data of scored sentences 126 can be produced on the fly, in real-time, and from a random selection of websites publicly available over the Internet (or privately available over another network), thus providing for more enhanced training of general NLP 104 with greater variety, producing a more robust trained NLP 110.

Figure 2:
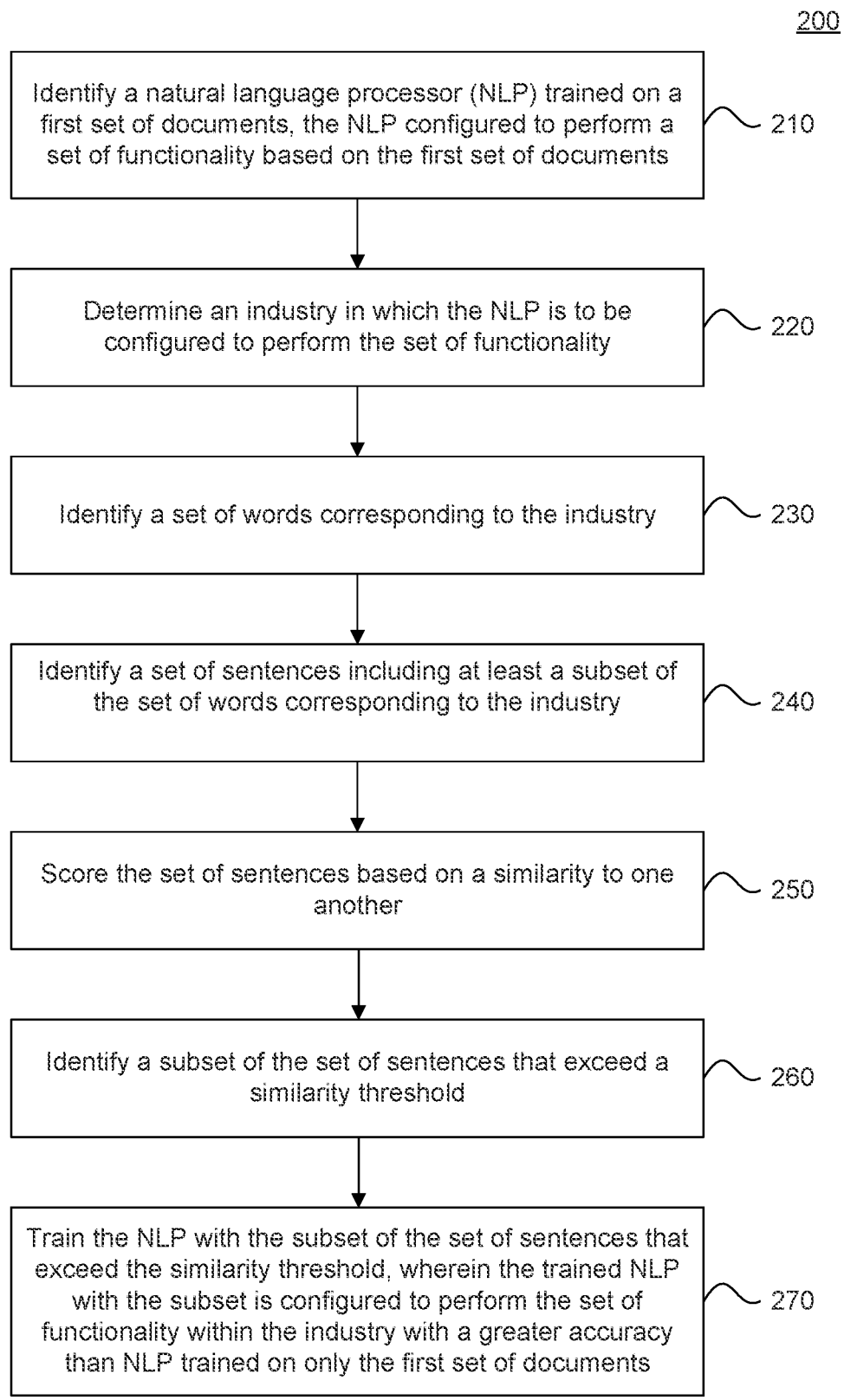
FIG. 2 is a flowchart illustrating example operations for functionality related to training and enriching a natural language processing system, according to some embodiments.

FIG. 2 is a flowchart 200 illustrating example operations for functionality related to training and enriching a natural language processing system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to the figures.

In 210, a natural language processor (NLP) trained on a first set of documents is identified, wherein the NLP is trained to perform a set of functionality based on the first set of documents. For example, general NLP 104 may be trained on general training docs 106. In an embodiment, general NLP 104 may be trained to perform general language processing functionality.

In 220, an industry in which the NLP is to be configured to perform the set of functionality is determined. For example, TES 102 may receive from a user an indication of topic 112 corresponding to a particular industry in which general NLP 104 is to be used. The topic 112 may be related to the industry, such as automotive manufacturing. Or may include multiple topics 112 related to the industry, including auto sales, auto manufacturing, and supply chain.

In 230, a set of words corresponding to the industry are identified. For example, TES 102 may include or have access to a corpus 114. Corpus 114 may be a set of related words 116A-C and/or topics 112. In some embodiments, corpus 114 may include different strength indicators indicating how closely different words 116A-C are related they are to the topic 112.

In 240, a set of sentences including at least a subset of the set of words corresponding to the industry are identified. For example, crawler 118 may search a selection, including a random selection, of websites and webpages for the words 116A-C related to topic 112. Crawler 118 may generate a set of prescreened sentences 122.

In 250, the set of sentences are scored based on a similarity to one another. For example, scorer 124 may perform a more detailed analysis of prescreened sentences 122 to identify semantically similar sentences. One possible scoring mechanism may be BERTScore.

In 260, a subset of the set of sentences that exceed a similarity threshold are identified. For example, scorer 124 may filter and/or batch or group the prescreened sentences 122 into a set of scored sentences 126 that only includes those sentences that exceed the score threshold 132.

In 270, the NLP is trained with the subset of the set of sentences that exceed the similarity threshold, wherein the trained NLP with the subset is configured to perform the set of functionality within the industry with a greater accuracy than NLP trained on only the first set of documents. For example, training system 134 may train general NLP 104 to identify and differentiate between semantically similar sentences, specific to topic 112, based on scored sentences 126. This enriched training may enable the generated trained NLP 110 to identify and respond to input with greater accuracy, particularly with regard to topic 112, than general NLP 104 because of the specific enriched training. In some embodiments, the training set of data may be augmented. For example, the enriched training set may include both a sentence or data set that was used for the similarity search and a sentence that includes a high score in terms of similarity.

Figure 3:
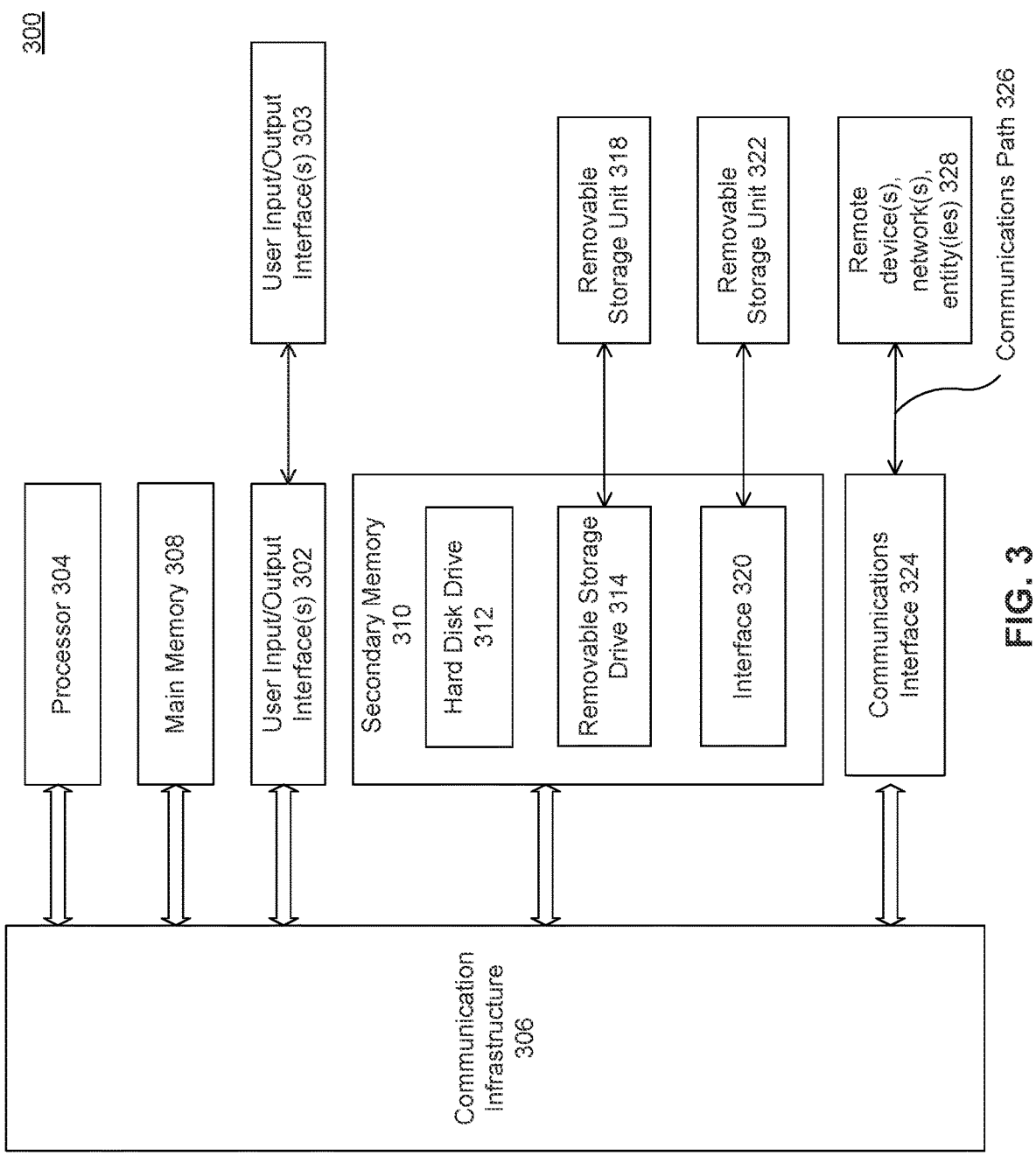
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random-access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   identifying a natural language processor (NLP) trained on a first set of documents, wherein the NLP is trained to perform a set of functionality based on the first set of documents;
   determining an industry in which the NLP is to be configured to perform the set of functionality;
   identifying a set of words corresponding to the industry;
   identifying a set of sentences including at least a subset of the set of words corresponding to the industry;
   scoring the set of sentences based on a similarity to one another;
   identifying a subset of the set of sentences that exceed a similarity threshold; and
   training the NLP with the subset of the set of sentences that exceed the similarity threshold, wherein the trained NLP with the subset is configured to perform the set of functionality within the industry with a greater accuracy than an NLP trained on only the first set of documents.

2. The method of claim 1, wherein the first set of documents are annotated with indications of correct and incorrect input and output.

3. The method of claim 2, wherein the subset of sentences are augmented indicating different variations of sentences with similar meanings.

4. The method of claim 1, wherein the identifying a set of sentences comprises:
   identifying a second set of documents, different from the first set of documents; and
   identifying, from the second set of documents, the set of sentences including at least a subset of the set of words corresponding to the industry.

5. The method of claim 4, wherein the second set of documents correspond to different webpages available on the Internet associated with the industry.

6. The method of claim 5, further comprising:
   crawling the different webpages publicly available on the Internet to identify the set of sentences.

7. The method of claim 1, wherein the scoring is based on BERTScore.

8. A system, comprising:
   a memory; and
   at least one processor coupled to the memory and configured to perform instructions that cause the at least one processor to perform operations comprising:
   identifying a natural language processor (NLP) trained on a first set of documents, wherein the NLP is trained to perform a set of functionality based on the first set of documents;
   determining an industry in which the NLP is to be configured to perform the set of functionality;
   identifying a set of words corresponding to the industry;
   identifying a set of sentences including at least a subset of the set of words corresponding to the industry;
   scoring the set of sentences based on a similarity to one another;
   identifying a subset of the set of sentences that exceed a similarity threshold; and
   training the NLP with the subset of the set of sentences that exceed the similarity threshold, wherein the trained NLP with the subset is configured to perform the set of functionality within the industry with a greater accuracy than an NLP trained on only the first set of documents.

9. The system of claim 8, wherein the first set of documents are annotated with indications of correct and incorrect input and output.

10. The system of claim 9, wherein the subset of sentences are augmented indicating different variations of sentences with similar meanings.

11. The system of claim 8, wherein the identifying a set of sentences comprises:
    identifying a second set of documents, different from the first set of documents; and
    identifying, from the second set of documents, the set of sentences including at least a subset of the set of words corresponding to the industry.

12. The system of claim 11, wherein the second set of documents correspond to different webpages available on the Internet associated with the industry.

13. The system of claim 12, the operations further comprising:
    crawling the different webpages publicly available on the Internet to identify the set of sentences.

14. The system of claim 8, wherein the scoring is based on BERTScore.

15. A non-transitory computer-readable medium having instructions stored thereon that, when executed by at least one computing device, cause the at least one computing device to perform operations comprising:
    identifying a natural language processor (NLP) trained on a first set of documents, wherein the NLP is trained to perform a set of functionality based on the first set of documents;
    determining an industry in which the NLP is to be configured to perform the set of functionality;
    identifying a set of words corresponding to the industry;
    identifying a set of sentences including at least a subset of the set of words corresponding to the industry;
    scoring the set of sentences based on a similarity to one another;
    identifying a subset of the set of sentences that exceed a similarity threshold; and
    training the NLP with the subset of the set of sentences that exceed the similarity threshold, wherein the trained NLP with the subset is configured to perform the set of functionality within the industry with a greater accuracy than an NLP trained on only the first set of documents.

16. The non-transitory computer-readable medium of claim 15, wherein the first set of documents are annotated with indications of correct and incorrect input and output.

17. The non-transitory computer-readable medium of claim 16, wherein the subset of sentences are augmented indicating different variations of sentences with similar meanings.

18. The non-transitory computer-readable medium of claim 15, wherein the identifying a set of sentences comprises:
   identifying a second set of documents, different from the first set of documents; and
   identifying, from the second set of documents, the set of sentences including at least a subset of the set of words corresponding to the industry.

19. The non-transitory computer-readable medium of claim 18, wherein the second set of documents correspond to different webpages available on the Internet associated with the industry.

20. The non-transitory computer-readable medium of claim 19, the operations further comprising:
   crawling the different webpages publicly available on the Internet to identify the set of sentences.

* * * * *